United States Patent
Arias et al.

(10) Patent No.: US 9,288,975 B1
(45) Date of Patent: *Mar. 22, 2016

(54) APPARATUS TO FISH

(71) Applicants: Pedro J. Arias, Miami, FL (US); Miguel E. Fernandez, Miami, FL (US)

(72) Inventors: Pedro J. Arias, Miami, FL (US); Miguel E. Fernandez, Miami, FL (US)

(*) Notice: Subject to any disclaimer, the term of this patent is extended or adjusted under 35 U.S.C. 154(b) by 275 days.

This patent is subject to a terminal disclaimer.

(21) Appl. No.: 13/651,680

(22) Filed: Oct. 15, 2012

Related U.S. Application Data

(63) Continuation-in-part of application No. 13/197,376, filed on Aug. 3, 2011, now Pat. No. 8,434,257.

(51) Int. Cl.
  *A01K 91/06* (2006.01)
  *A01K 97/06* (2006.01)
  *A01K 97/00* (2006.01)

(52) U.S. Cl.
  CPC .............. *A01K 97/06* (2013.01); *A01K 91/06* (2013.01); *A01K 97/00* (2013.01)

(58) Field of Classification Search
  CPC ........ A01K 91/06; A01K 97/00; A01K 97/06
  USPC ........... 43/4, 15–17, 43.1, 43.11, 43.14, 54.1, 43/56, 57.2, 57.3
  See application file for complete search history.

(56) References Cited

U.S. PATENT DOCUMENTS

| | | | |
|---|---|---|---|
| 1,625,988 A | 4/1927 | Dice | |
| 2,517,867 A * | 8/1950 | Glahn | 242/137.1 |
| 2,603,429 A | 7/1952 | Jaworowski | |
| 2,757,881 A | 8/1956 | Halsey | |
| 3,174,703 A | 3/1965 | Falkum | |
| 3,378,134 A * | 4/1968 | Wilkinson et al. | 312/97.1 |
| 4,082,235 A | 4/1978 | Dauvergne | |
| 4,128,170 A * | 12/1978 | Elliott | 206/315.11 |
| 4,168,042 A | 9/1979 | Joe et al. | |
| 4,229,900 A | 10/1980 | Collins | |
| 4,607,449 A | 8/1986 | Brachear | |
| 4,688,740 A | 8/1987 | Weeks et al. | |
| 4,756,412 A * | 7/1988 | Graves et al. | 206/315.11 |
| 4,862,636 A | 9/1989 | Doskocil et al. | |
| D307,457 S | 4/1990 | Corrie | |
| 4,999,943 A * | 3/1991 | Crabtree | 43/54.1 |
| 5,337,892 A * | 8/1994 | Zaffina | 206/315.11 |
| 5,542,206 A * | 8/1996 | Lisch | 43/54.1 |
| 5,547,098 A * | 8/1996 | Jordan | 220/23.86 |
| 5,593,061 A * | 1/1997 | Prochnow | 220/507 |
| 5,813,528 A * | 9/1998 | Bliek et al. | 206/315.11 |
| 6,796,076 B1 | 9/2004 | Bennett | |
| 6,854,207 B1 | 2/2005 | Strope | |
| 7,913,446 B1 * | 3/2011 | Aldridge, III | 43/57.1 |
| 8,434,257 B2 * | 5/2013 | Arias | A01K 89/08 43/4 |

* cited by examiner

*Primary Examiner* — David Parsley
(74) *Attorney, Agent, or Firm* — Albert Bordas, P.A.

(57) ABSTRACT

An apparatus to fish having a body with exterior and interior faces extending from a first edge to a first end. The body further has a handle fixed to the interior face. A housing assembly has a clasp and is removably mounted from within the body, whereby the clasp receives the handle. The body further has a lip assembly. The lip assembly has a second edge and a first sidewall. The lip assembly further has at least one aperture and at least one through hole. The lip assembly is defined at the first end. The first sidewall has at least one indent. Each aperture securely receives a tip of a respective fishing hook that is tied to a distal end of fishing line. A proximal end of the fishing line is tied to the at least one through hole.

15 Claims, 5 Drawing Sheets

APPARATUS TO FISH

BACKGROUND OF THE INVENTION

1. Field of the Invention

The present invention relates to fishing gear, and more particularly, to fishing apparatuses.

2. Other Related Applications

The present application is a continuation-in-part of pending U.S. patent application Ser. No. 13/197,376, filed on Aug. 3, 2011, which is hereby incorporated by reference.

3. Description of the Related Art

Applicant believes that one of the closest references corresponds to U.S. Pat. No. D307457 issued to Corrie on Apr. 24, 1990 for a fishing hand caster.

Applicant believes that another reference corresponds to U.S. Pat. No. 6,854,207 issued to Strope on Feb. 15, 2005 for a fishing line spool for jug fishing.

Applicant believes that another reference corresponds to U.S. Pat. No. 6,796,076 issued to Bennett on Sep. 28, 2004 for a float supported fishing apparatus with automatic hook set.

Applicant believes that another reference corresponds to U.S. Pat. No. 4,862,636 issued to Doskocil, et al. on Sep. 5, 1989 for a hand-held trotline holder.

Applicant believes that another reference corresponds to U.S. Pat. No. 4,688,740 issued to Weeks, et al. on Aug. 25, 1987 for a hand held reel.

Applicant believes that another reference corresponds to U.S. Pat. No. 4,607,449 issued to Brachear on Aug. 26, 1986 for a fishing jug.

Applicant believes that another reference corresponds to U.S. Pat. No. 4,229,900 issued to Collins on Oct. 28, 1980 for a fishing apparatus.

Applicant believes that another reference corresponds to U.S. Pat. No. 4,168,042 issued to Joe, et al. on Sep. 18, 1979 for a kite string reel structure.

Applicant believes that another reference corresponds to U.S. Pat. No. 4,082,235 issued to Dauvergne on Apr. 4, 1978 for a pole-less fishing rig.

Applicant believes that another reference corresponds to U.S. Pat. No. 3,174,703 B1 issued to Falkum on Mar. 23, 1965 for a line-storing reel.

Applicant believes that another reference corresponds to U.S. Pat. No. 2,757,881 issued to Halsey on Aug. 7, 1956 for a hand line drum.

Applicant believes that another reference corresponds to U.S. Pat. No. 2,603,429 issued to Jaworowski on Jul. 15, 1952 for a fishing apparatus.

Applicant believes that another reference corresponds to U.S. Pat. No. 1,625,988 issued to Dice on Apr. 26, 1927 for a fishing devise.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an apparatus to fish that comprises a body having a lip that securely and removably receives the tip of a fishing hook connected to the distal end of a fishing line wound around the body.

It is another object of this invention to provide an apparatus to fish comprising a housing assembly removably mounted to the body and having two housings to store spare hooks, weights and fishing accessories.

It is another object of this invention to provide an apparatus to fish with housings to promote buoyancy/floatation in water.

It is another object of this invention to provide an apparatus to fish having peripheral channels to store spare fishing lines.

It is another object of this invention to provide an apparatus to fish comprising a clasp that receives a removable handle when the invention is assembled.

It is another object of this invention to provide an apparatus to fish comprising a slidable member that covers the peripheral channels when they are not in use.

It is another object of this invention to provide an apparatus to fish that is volumetrically efficient for carrying, transporting, usage, and storage.

It is another object of this invention to provide an apparatus to fish that can be readily assembled and disassembled without the need of any special tools.

It is another object of this invention to provide an apparatus to fish, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
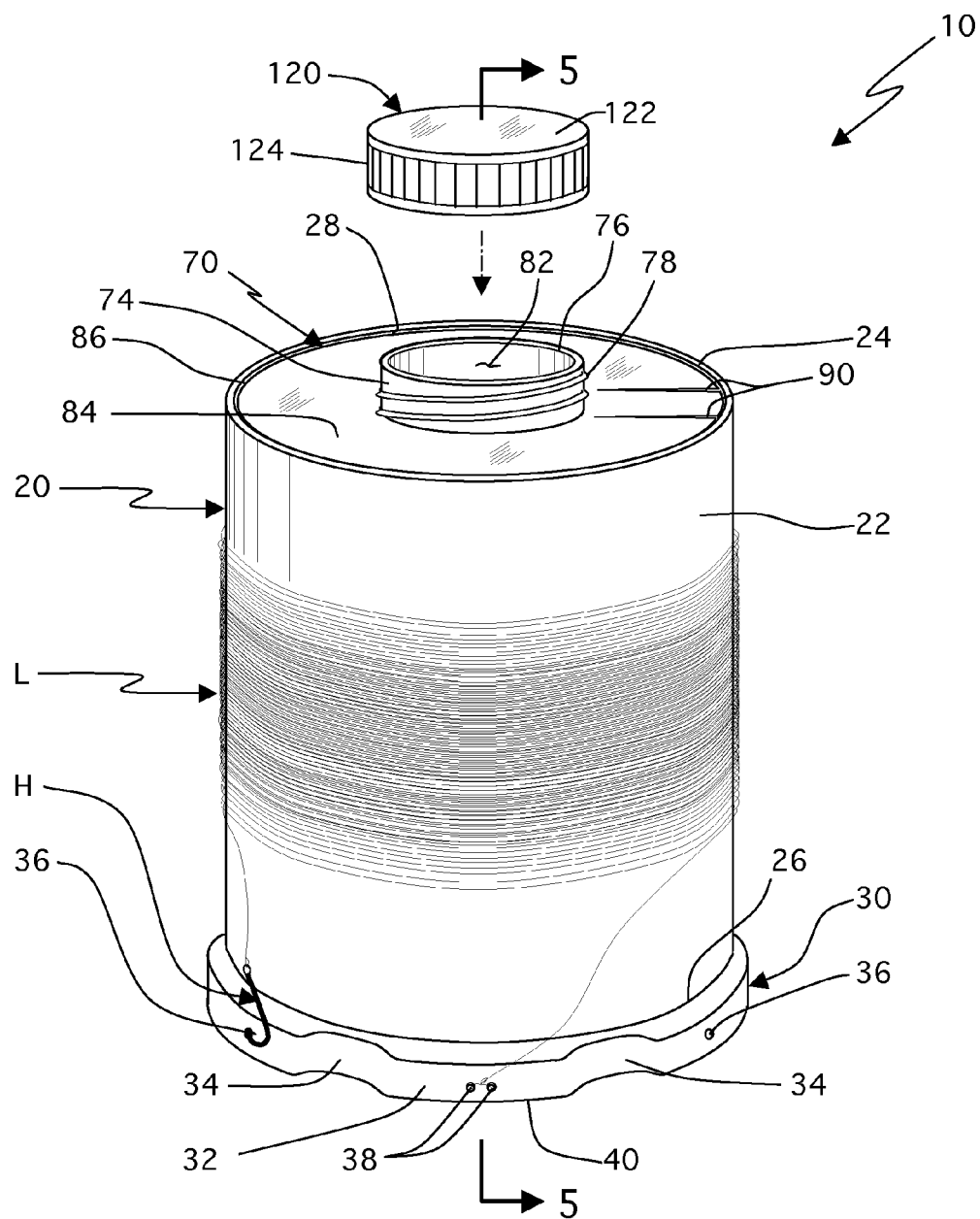
FIG. 1 is an isometric view of the instant invention in an assembled configuration.

Referring now to the drawings, the present invention is an apparatus to fish and is generally referred to with numeral 10. It can be observed that it basically includes body 20, housing assembly 70, and slidable member 160.

As seen in FIG. 1, body 20 comprises exterior and interior faces 22 and 28 extending from edge 24 to end 26. Lip assembly 30 is defined at end 26. Lip assembly 30 comprises edge 40 and sidewall 32 having at least one indent 34, where a user can place his/her thumb thereon for grasping/gripping purposes. At least one aperture 36 and through hole 38 are disposed around sidewall 32. In a preferred embodiment, line L is wound around exterior face 22. Apertures 36 securely receive a tip of a hook H that is tied to a distal end of respective line L when apparatus to fish 10 is not in use. A proximal end of line L is tied to through holes 38.

Figure 2:
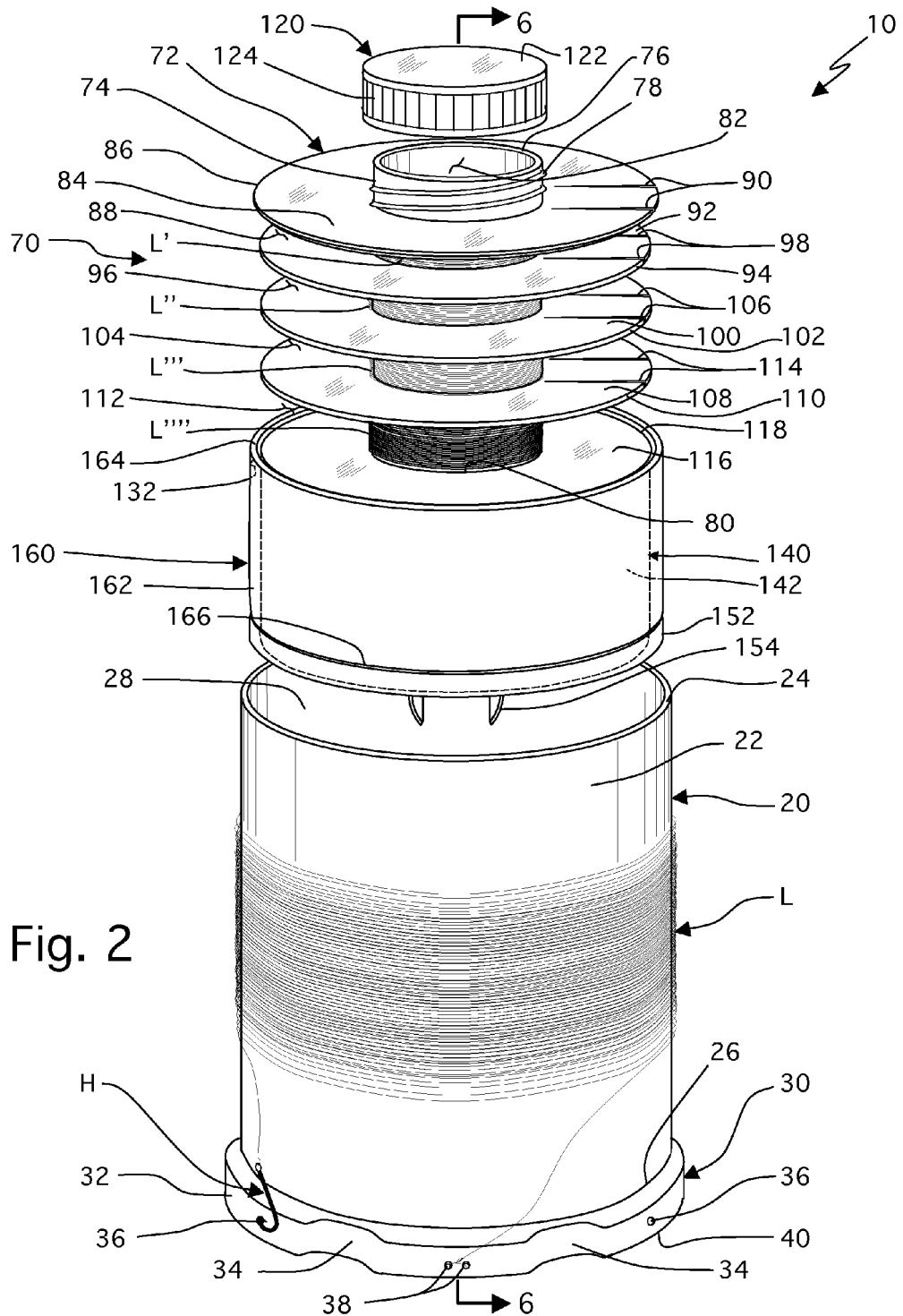
FIG. 2 is an isometric view of the instant invention in a disassembled configuration.

As seen in FIG. 2, housing assembly 70 is removably housed within body 20. Housing assembly 70 comprises housing 72 with sidewall 74 extending from edge 76 to end 80 defining cavity 82. Cavity 82 serves as an air chamber to promote buoyancy/floatation in water. Threads 78 extend a predetermined distance from edge 76. Exterior wall 84 extends outwardly from sidewall 74. Dividers 92, 100, and 108 also extend from sidewall 74 substantially parallel to exterior wall 84. In addition, base wall 116 extends outwardly from sidewall 74 substantially parallel to exterior wall 84 and dividers 92, 100, and 108. Base wall 116 is aligned with end 80. Exterior wall 84, dividers 92, 100, and 108, and base wall 116 define peripheral channels 88, 96, 104 and 112. Exterior wall 84 has stepped edge 86 and at least one slit 90 extending from stepped edge 86 towards sidewall 74. Similarly, dividers 92, 100, and 108 have respective edges 94, 102, and 110 and at least one slit 98, 106 and 114 extending from respective edges 94, 102, and 110 towards sidewall 74. Base wall 116 has edge 118. Spare lines L', L", L'" and L"" can be wound within peripheral channels 88, 96, 104 and 112. The proximal and distal ends of lines L', L", L'" and L"" are secured at respective slits 90, 98, 106 and 114. Spare lines L', L", L'" and L"" may be of different lengths, and gauges/diameter, and strengths.

Slidable member 160 has sidewall 162 with edges 164 and 166. The outside diameters of dividers 92, 100, and 108 and base wall 116 are slightly smaller than the inside diameter of sidewall 162, and the outside diameter of exterior wall 84 is slightly larger than the inside diameter of sidewall 162.

Housing 140 is fixed to base wall 116. Housing 140 has sidewall 142 and removable cap 152 with clasp 154. The outside diameter of sidewall 142 is slightly smaller than the inside diameter of sidewall 162. Removable cap 152 does not protrude beyond a plane defined by sidewall 162.

Figure 3:
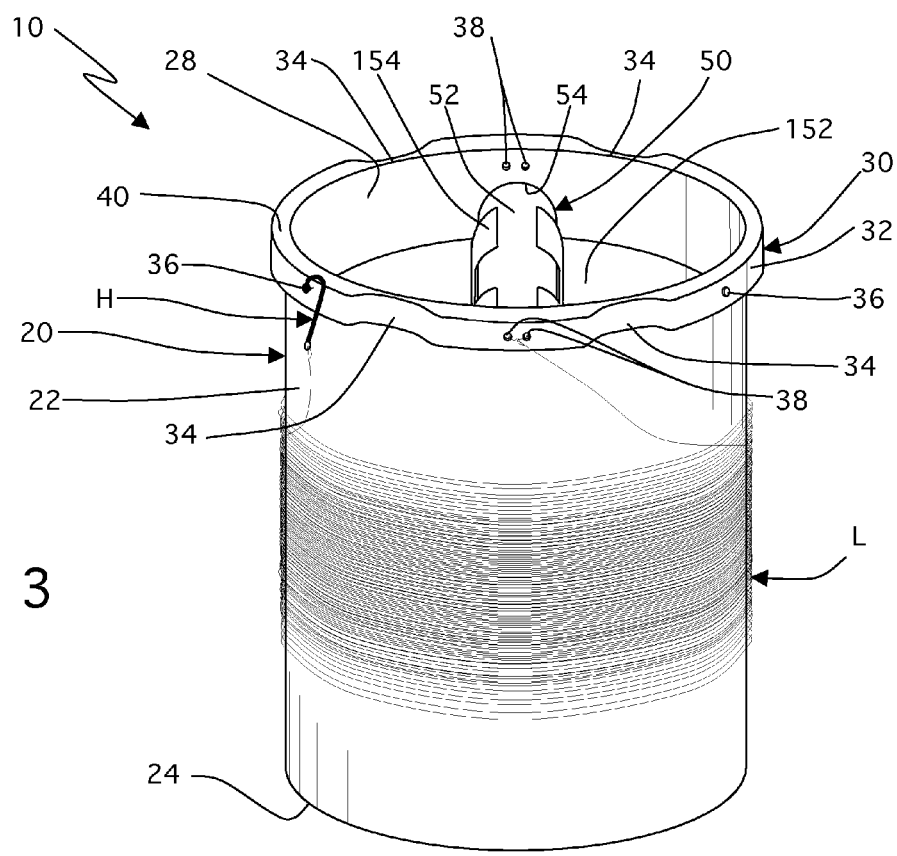
FIG. 3 is an isometric view of the instant invention longitudinally inverted with respect to its position illustrated in FIG. 1.

As seen in FIG. 3, body 20 further comprises handle 50. Handle 50 is transversally fixed to interior face 28 at a first predetermined distance from edge 40. When instant invention 10 is assembled, handle 50 cooperatively engages into clasp 154, whereby clasp 154 receives handle 50.

Figure 4:
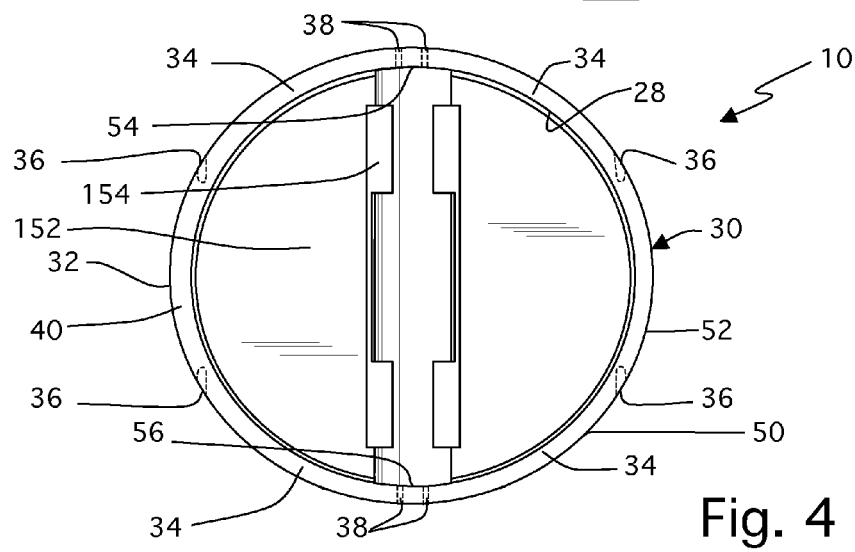
FIG. 4 is a bottom plan view of the instant invention in the assembled configuration.

As seen in FIG. 4, handle 50 comprises ends 54 and 56 and sidewall 52.

Figure 5:
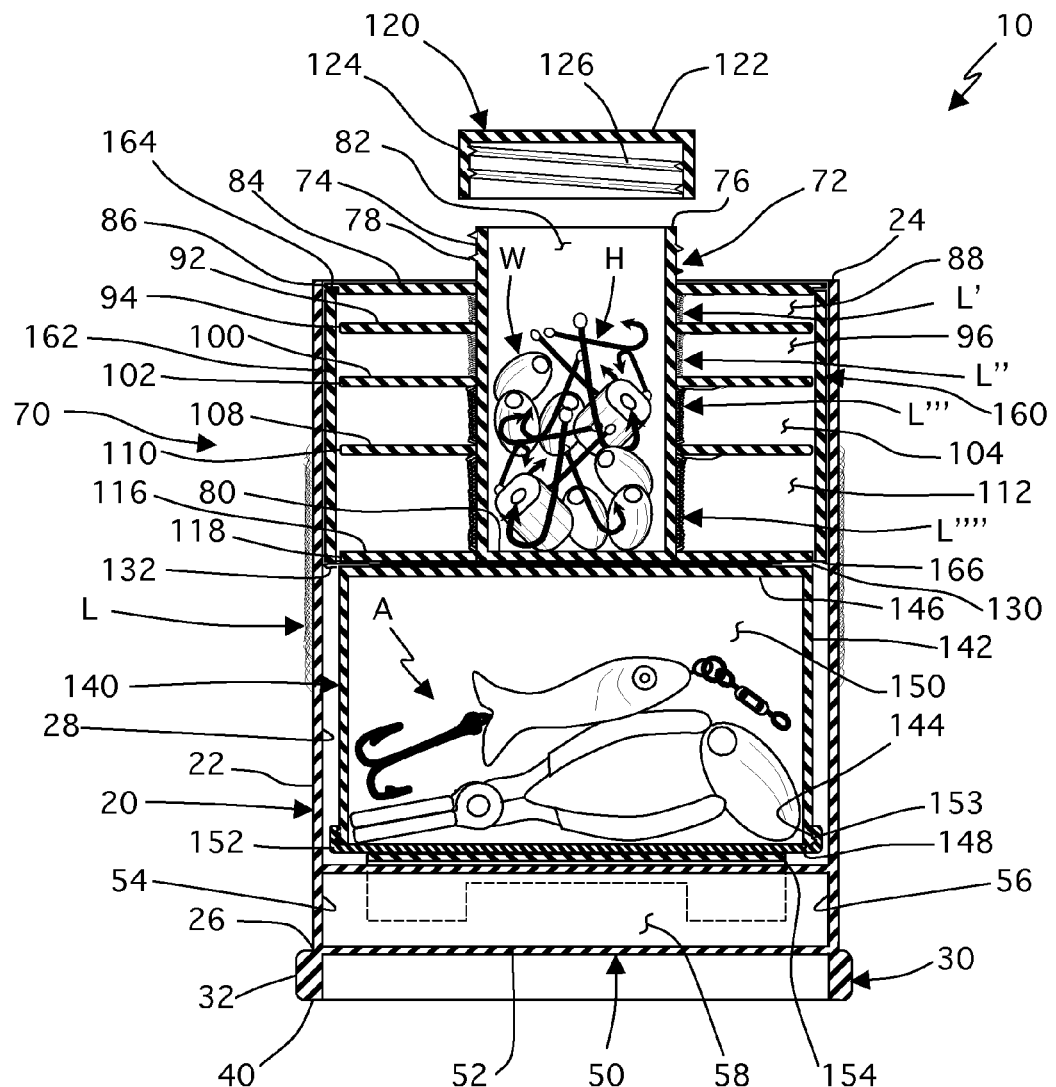
FIG. 5 is a cross-section view taken along the lines 5-5 as illustrated in FIG. 1.

As seen in FIG. 5, sidewall 52 defines cavity 58. Cavity 58 serves as an air chamber to promote buoyancy/floatation in water. Cavity 82 is an air chamber to promote buoyancy/floatation in water and serves for storage of hooks H and weights W. Removable cap 120 secures onto housing 72. Removable cap 120 comprises exterior wall 122, sidewall 124 and threads 126.

Housing 140 comprises end 146. Sidewall 142 and end 146 define cavity 150. When closed with removable cap 152, cavity 150 is an air chamber to promote buoyancy/floatation in water and serves for storage of hooks H and/or weights W and/or fishing accessories A. Sidewall 142 has edge 148. Threads 144 extend a predetermined distance from edge 148. Removable cap 152 has threads 153. Removable cap 152 is secured onto edge 148 with threads 153 cooperatively engaging threads 144.

Housing 140 is fixed to base wall 116. Specifically, base wall 116 is fixed to end 146, defining channel 130. Channel 130 has spring 132 fixed thereto. A distal end of spring 132 resiliently protrudes from channel 130.

When slidable member 160 is positioned over housing 72 as shown in FIG. 5, edge 164 is stopped by stepped edge 86 and spring 132 locks sidewall 162 in place, thus slidable member 160 covers access to peripheral channels 88, 96, 104 and 112.

Figure 6:
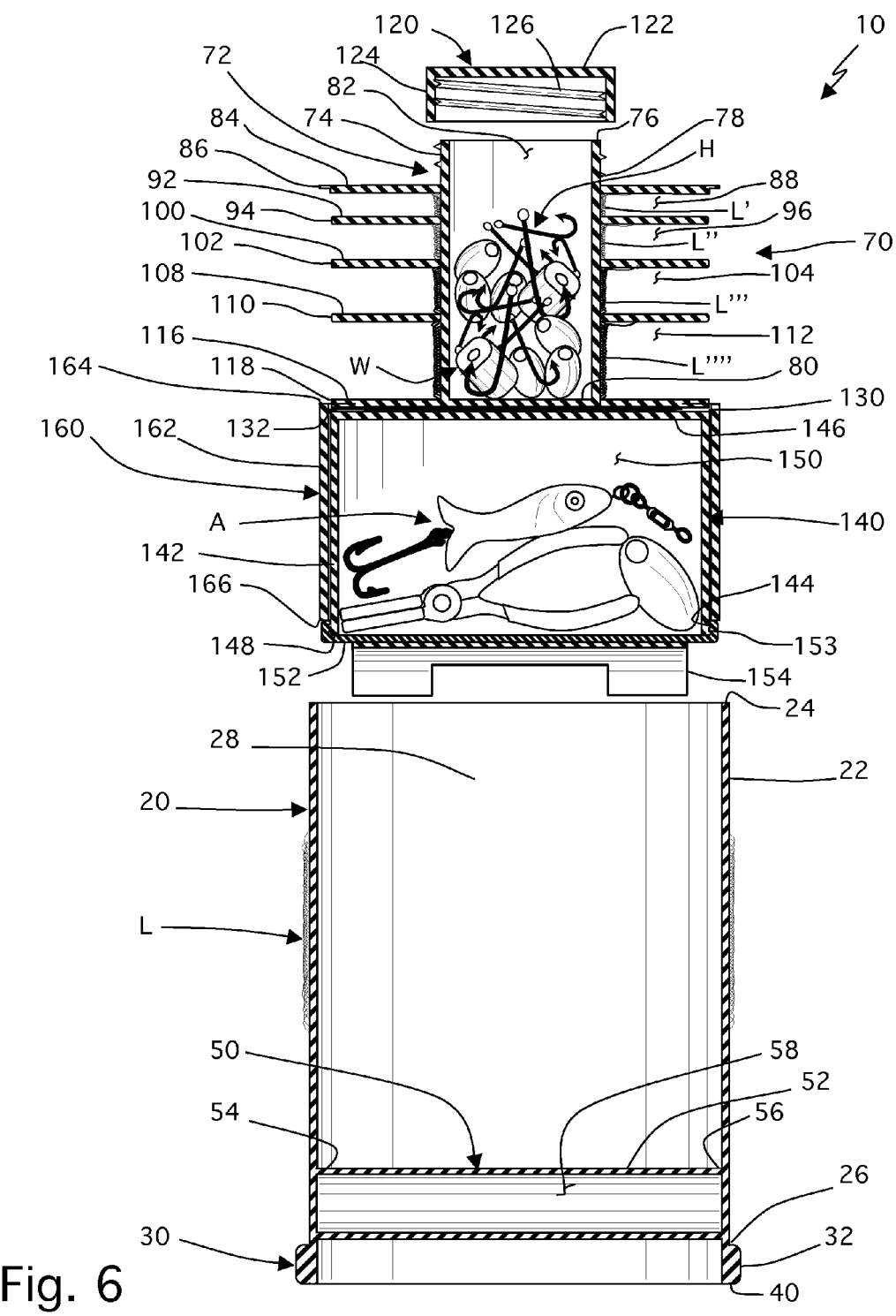
FIG. 6 is a cross-section view taken along the lines 6-6 as illustrated in FIG. 2.

When slidable member 160 is positioned over housing 140 as shown in FIG. 6, edge 166 is stopped by removable cap 152 and spring 132 interacts with sidewall 162 to keep it in place, thus permitting the user access peripheral channels 88, 96, 104 and 112.

In a preferred embodiment, slidable member 160 has cooperative dimensions and shape to be housed within body 20 when apparatus to fish 10 is assembled, as best seen in FIG. 5. To keep invention 10 assembled, handle 50 is engaged within clasp 154. The reverse process is used to remove housing assembly 70 from body 20, whereby the user forces removable cap 152 away from handle 50 to disengage housing assembly 70 from body 20, as best seen in FIG. 6.

In a preferred embodiment, instant invention 10 is made of buoyant, weather resistant, and lightweight matter.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus to fish, comprising:
   A) a body having exterior and interior faces extending from a first edge to a first end, said body further comprising a handle fixed to said interior face; and
   B) a housing assembly comprising a clasp, said housing assembly removably mounted from within said body whereby said clasp receives said handle, said housing assembly further comprising a first housing having a first sidewall that extends from a second edge to a second end defining a first cavity, extending from said first sidewall are a plurality of dividers that define a plurality of peripheral channels, each of said plurality of peripheral channels receives spare line, said first housing comprises a removable threaded screw cap for accessing said first cavity, said housing assembly further comprises a second housing defining a second cavity, said first cavity is positioned above and perpendicularly to said second cavity, and said first cavity is smaller than said second cavity, said clasp and said handle are disposed adjacent to a bottom of said body in an assembled state, whereby said handle is transversally fixed to said interior face at a first predetermined distance from said first edge, said clasp having two opposed tension arms extending along a longitudinal length of said handle, said opposed tension arms of said clasp grasping and engaging a substantial portion of said handle and said opposed tension arms in a C-shaped configuration about a diameter of said handle.

2. The apparatus to fish set forth in claim 1, further characterized in that said body further comprises a lip assembly, said lip assembly comprises a third edge and a second sidewall, said lip assembly further comprises at least one aperture and at least one through hole.

3. The apparatus to fish set forth in claim 2, further characterized in that said lip assembly is defined at said first end.

4. The apparatus to fish set forth in claim 2, further characterized in that said second sidewall has at least one indent.

5. The apparatus to fish set forth in claim 2, further characterized in that each said at least one aperture securely receives a tip of a respective fishing hook that is tied to a distal end of fishing line.

6. The apparatus to fish set forth in claim 5, further characterized in that a proximal end of said fishing line is tied to said at least one through hole.

7. The apparatus to fish set forth in claim 1, further characterized in that said handle comprises third and fourth ends and a second sidewall defining a second cavity that serves as an air chamber for buoyancy.

8. The apparatus to fish set forth in claim 1, further characterized in that said second housing comprises a removable cap for accessing said second cavity, said clasp is fixed onto said removable cap.

9. The apparatus to fish set forth in claim 8, further characterized in that said second housing further comprises a second sidewall extending from a third edge to a third end.

10. The apparatus to fish set forth in claim 9, further characterized in that a predetermined section of said second sidewall extending from said third edge is threaded to receive said removable cap.

11. The apparatus to fish set forth in claim 1, further characterized in that a predetermined section of said first sidewall extending from said second edge is threaded to receive said removable cap.

12. The apparatus to fish set forth in claim 11, further characterized in that an exterior wall extends outwardly from said first sidewall.

13. The apparatus to fish set forth in claim 12, further characterized in that a base wall extends outwardly from said first sidewall.

14. The apparatus to fish set forth in claim 13, further characterized in that said plurality of dividers are positioned between said exterior and base walls.

15. The apparatus to fish set forth in claim 1, further comprising a slidable member extending from a third edge to a fourth edge, said slidable member movable from over said second housing to over said first housing and vice versa.

* * * * *